Figure 28:
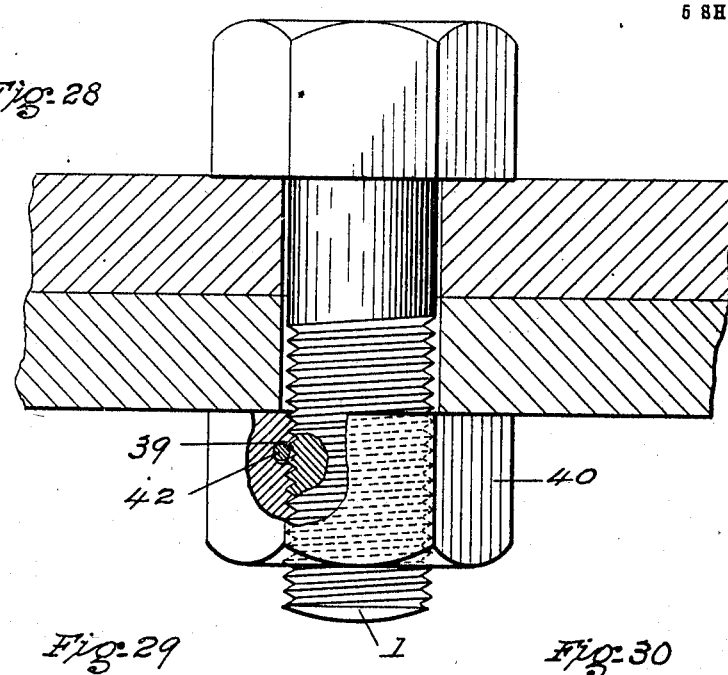
Figure 29:
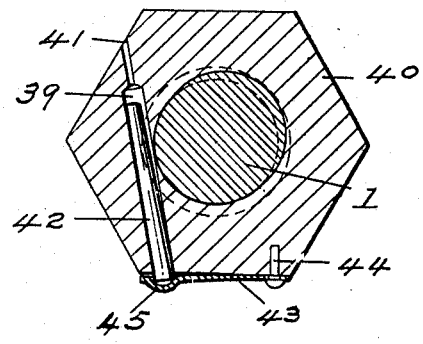

M. JACOBS.
SELF LOCKING NUT.
APPLICATION FILED OCT. 19, 1909.
982,502.
Patented Jan. 24, 1911.
5 SHEETS—SHEET 1.
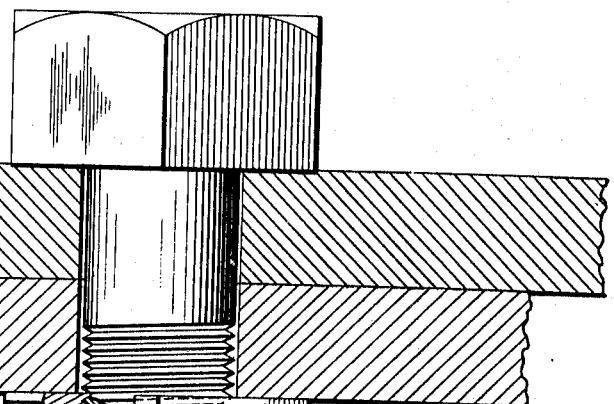
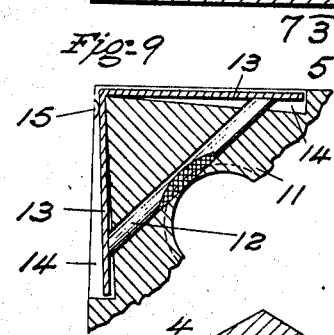
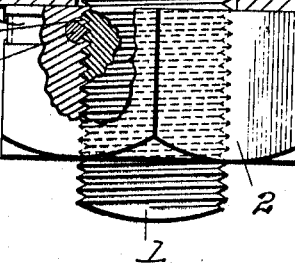
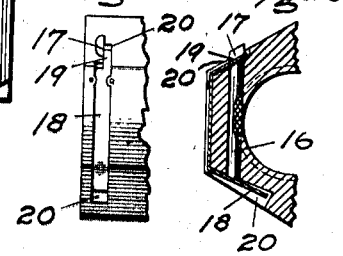
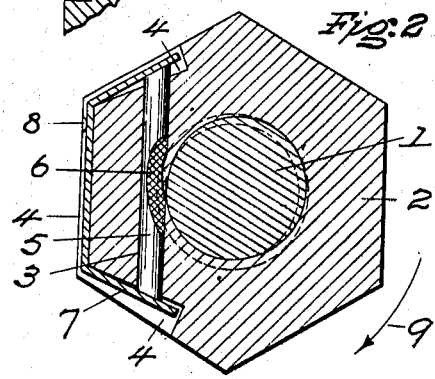
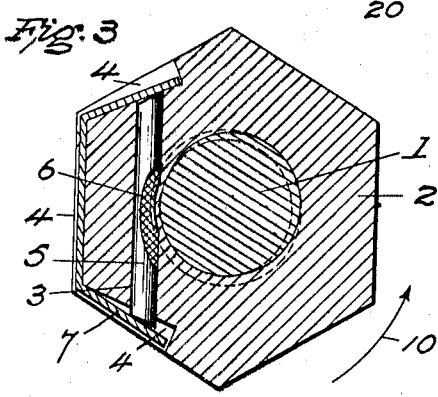
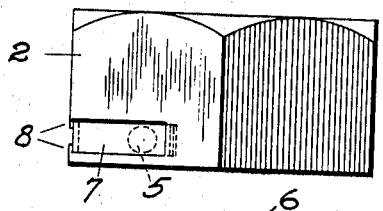
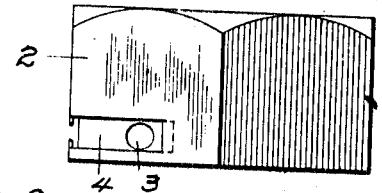
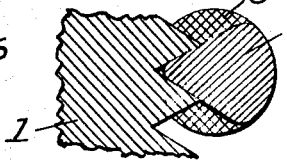
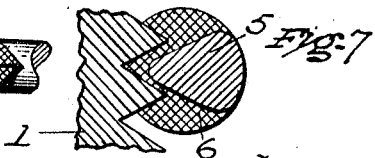
Witnesses:
Wm. J. Chipman
Mrs. Ashley Kelly
Inventor
Morris Jacobs
By his Attorney
Henry D. Williams M. JACOBS.
SELF LOCKING NUT.
APPLICATION FILED OCT. 19, 1909.
982,502.
Patented Jan. 24, 1911.
5 SHEETS—SHEET 2.
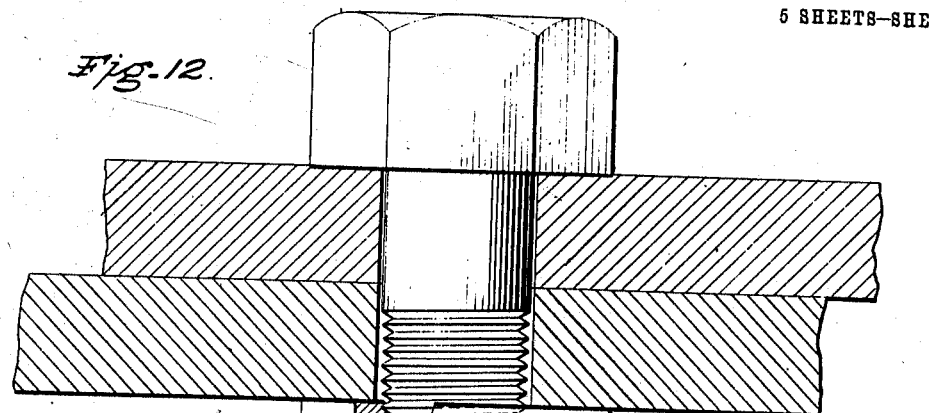
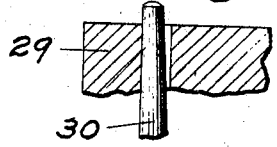
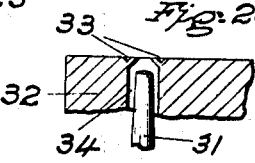
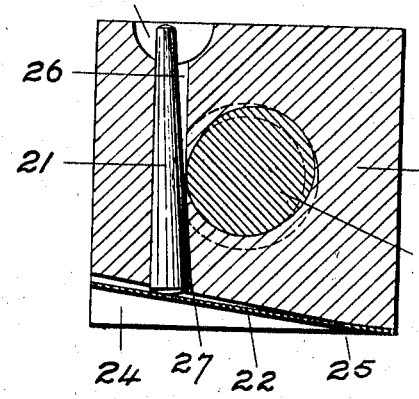
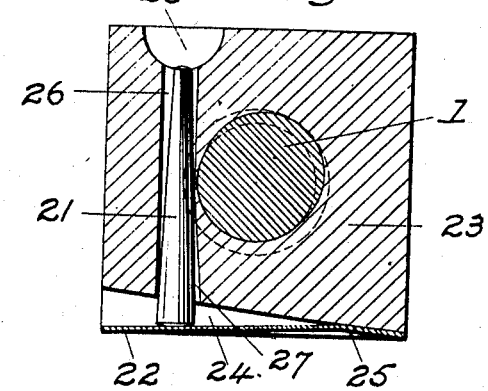
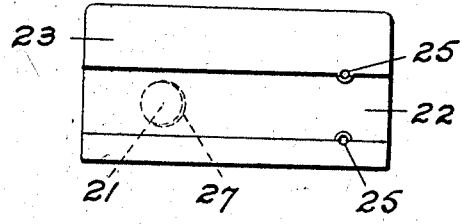
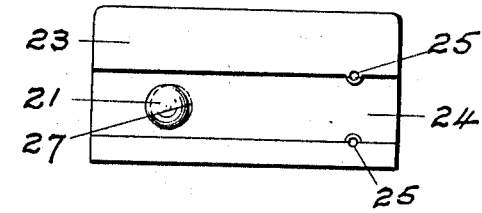

M. JACOBS.
SELF LOCKING NUT.
APPLICATION FILED OCT. 19, 1909.
982,502.
Patented Jan. 24, 1911.
5 SHEETS—SHEET 3.
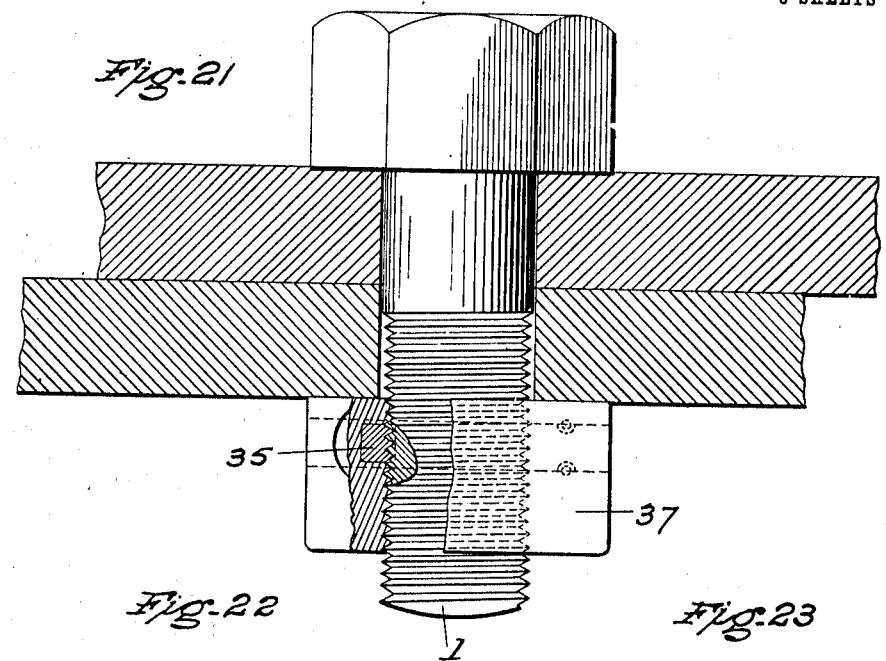
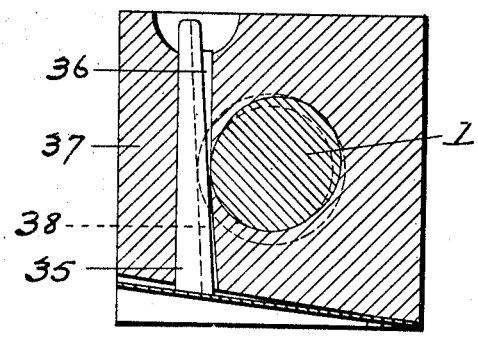
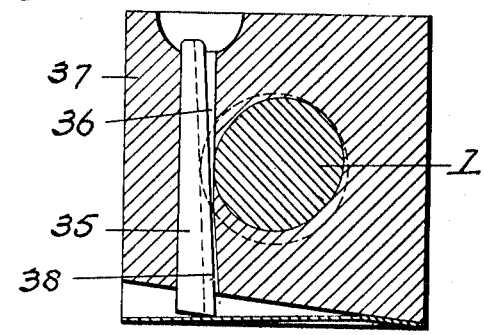
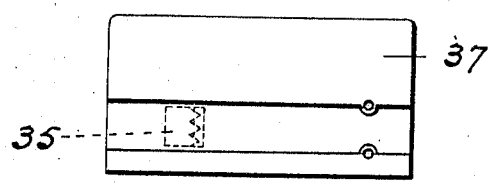
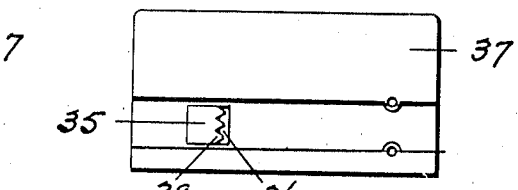
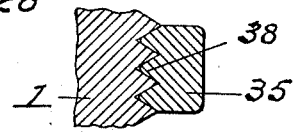
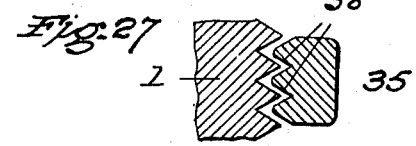
Witnesses:
Wm J. Chipman
Wm Ashley
Inventor
Morris Jacobs
By his Attorney
Henry A. Williams

M. JACOBS.
SELF LOCKING NUT.
APPLICATION FILED OCT. 19, 1909.

982,502.

Patented Jan. 24, 1911.
5 SHEETS—SHEET 4.

Witnesses:
Wm J. Chipman
Edw. Ashley Kelly

Inventor
Morris Jacobs
By his Attorney
Henry D. Williams

M. JACOBS.
SELF LOCKING NUT.
APPLICATION FILED OCT. 19, 1909.
982,502.
Patented Jan. 24, 1911.
5 SHEETS—SHEET 5.
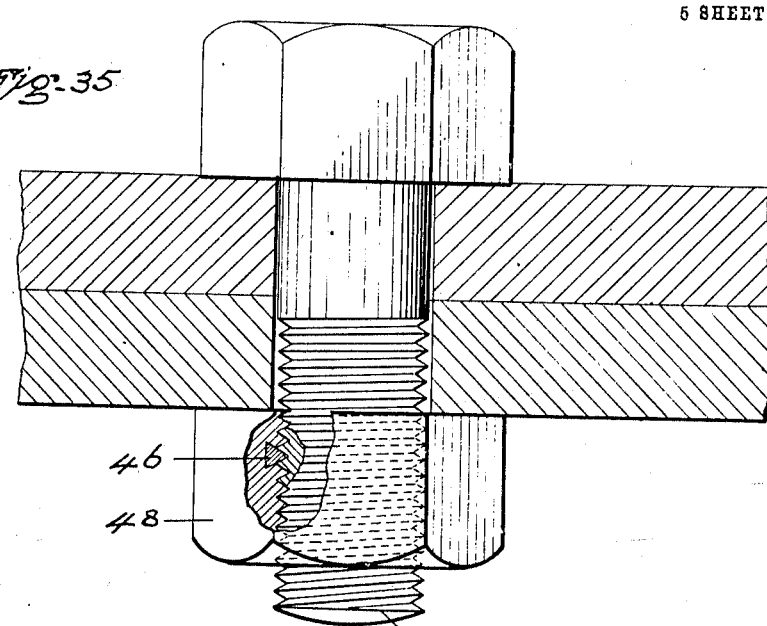
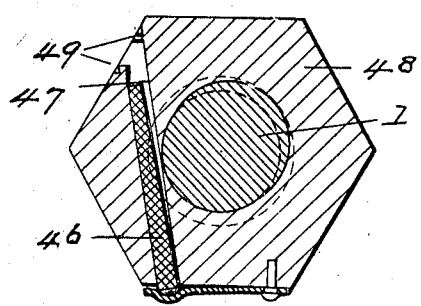
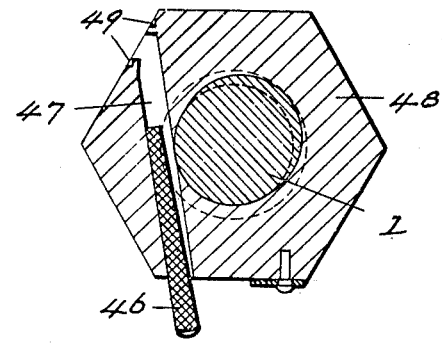
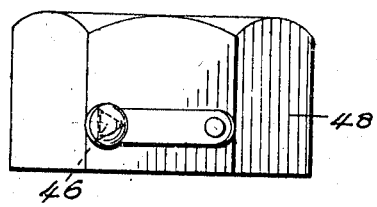
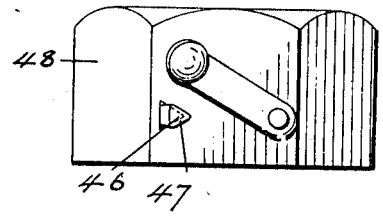
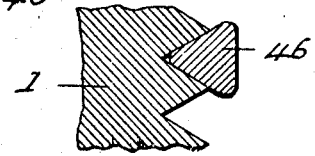
Witnesses:
Wm J. Chipman
Wm. Ashley Kelly
Inventor
Morris Jacobs
By his Attorney
Henry D. Williams

UNITED STATES PATENT OFFICE.

MORRIS JACOBS, OF NEW YORK, N. Y.

SELF-LOCKING NUT.

982,502.    Specification of Letters Patent.    Patented Jan. 24, 1911.

Application filed October 19, 1909. Serial No. 523,449.

*To all whom it may concern:*

Be it known that I, MORRIS JACOBS, a citizen of the United States, residing in the borough of Brooklyn, city of New York, in the county of Kings and State of New York, have invented certain new and useful Improvements in Self-Locking Nuts, of which the following is a specification, reference being had therein to the accompanying drawings, forming part thereof.

My invention relates to means for locking coöperative screw-threaded parts, such as bolts and nuts, against unintentional or accidental unscrewing, as often occurs as a result of vibrations and jars attendant with use, for example, on vehicles of all kinds, railroad fish-plates, bridges, agricultural machinery, engines, and in many other uses.

The general objects of my invention are simplicity of construction, inexpensiveness of manufacture and effectiveness of operation.

More particular objects of my invention are the employment of bolts of ordinary construction, secure locking of the parts without mutilation or injury, self-tightening of the parts when subjected to vibration, and ready intentional unscrewing of the parts without mutilation or injury.

In carrying out my invention I employ a freely sliding wedge carried by the nut and adapted to be shifted in position by frictional engagement with the threads of the bolt.

My invention includes several novel features and combinations of parts hereinafter described.

I shall now describe my invention with reference to the accompanying drawings and shall thereafter point out my invention in claims.

Figure 30:
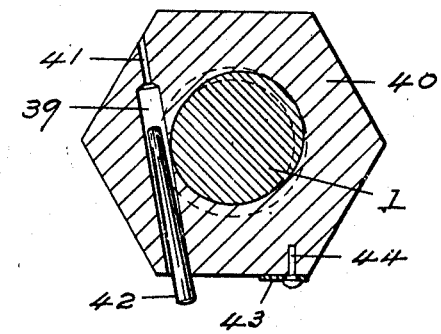

Figure 1 is an elevation, partly in section, showing a self-locking nut locked on a bolt and coacting with the bolt in clamping two objects together. Fig. 2 is a cross-section through the bolt, nut and locking devices as viewed from the outer or screw end of the bolt and shows the locking wedge at locking position. Fig. 3 is a similar view, but with the locking wedge moved to non-locking position. Fig. 4 is a nelevation of the nut equipped with the locking devices as viewed from the bottom of Fig. 2, the bolt being omitted. Fig. 5 is a view similar to Fig. 4, but with the locking devices removed. Fig. 6 is an enlarged detail showing, in section, the wedge pin in locking relation to the threads of the bolt. Fig. 7 is a view similar to Fig. 6, but with the wedge pin at non-locking position. Fig. 8 is an enlarged elevation of the locking wedge pin, portions being broken away. Fig. 9 is a view similar to Fig. 2 of a modified construction wherein the locking device is applied to a square instead of to a hexagonal nut, portions being broken away and the bolt being omitted. Fig. 10 is a similar view of another slightly modified construction. Fig. 11 is an elevation of the nut shown in Fig. 10, portions being broken away. Figs. 12 to 18, inclusive, are views similar, respectively, to Figs. 1 to 7, inclusive, of another modified construction, excepting that in Fig. 16 the spring only is removed, the locking wedge being left in the nut. Fig. 19 is a view similar to Fig. 13 and shows a slight modification of the nut shown in Fig. 13, portions being broken away. Fig. 20 is a similar view of another slightly modified construction. Figs. 21 to 27, inclusive, are views similar, respectively, to Figs. 12 to 18, inclusive, of another modified construction. Figs. 28 to 34, inclusive, are views similar, respectively, to Figs. 12 to 18, inclusive, of another modified construction, excepting that Fig. 32 is an elevation of the nut as shown in Fig. 30 looking upward. Figs. 35 to 41, inclusive, are views similar, respectively, to Figs. 28 to 34, inclusive, of another modified construction.

In the embodiment of my invention illustrated in Figs. 1 to 8, inclusive, of the accompanying drawings, the ordinary bolt 1 has screwed thereon a self-locking nut 2, which is provided with locking means. The nut 2 has a cylindrical pin-receiving hole 3 extending through the nut transversely to the bolt-receiving aperture and communicating therewith substantially to the depth of the threads, as indicated in Figs. 1, 2 and 3, portions of the threads of the nut being removed by the hole 3. The nut 2 is of the hexagonal type and is provided with an external transverse groove 4 extending across one side of the nut and partially across two adjacent sides, the terminal portions of the groove increasing in depth and the hole 3 opening at opposite ends into these deeper terminal portions of the groove. Contained in the pin-receiving hole 3 and extending to the outside of the nut at both ends is a cylindrical locking wedge or wedge pin 5, having at its median portion a cut away or milled out portion 6 forming a wedge transversely of the pin, adapted to fit between two of the threads of the nut, as most clearly shown in Figs. 1 and 6, the edge of this transverse wedge being slightly rounded, as shown most clearly in the enlarged views, Figs. 6 and 7. Also a wedge is formed longitudinally of the wedge pin 5 (Fig. 8), the wedge portion 6 being roughened or knurled as indicated to more securely engage the threads of the bolt 1. The wedge-shaped portion 6 of the locking pin 5 is adapted to have locking engagement with the screw threads of the bolt 1, the pin 5 being slidable longitudinally in the transverse hole 3 to and from locking position. A bent leaf spring 7 is fixed in the groove 4, being shown as held in place by an upsetting at 8 of the metal of the nut against the median portion of the spring. The spring 7 forms closures for the ends of the hole 3 and also, as illustrated in Figs. 2 and 3, the lower end of the spring presses upward on the lower end of the wedge pin 5 and tends to slide it into locking engagement with the threads of the bolt, as shown in Fig. 2, the upper end of the spring 7 being normally out of contact with the bottom of the groove 4 (Fig. 2) to permit the locking wedge to freely move to the locking position. When the nut 2 is rotated in the direction indicated by the arrow 9 (Fig. 2) the frictional contact of the threads of the bolt 1 with the roughened wedge-shaped portions 6 of the wedge pin 5 will slide the pin 5 away from its locking position sufficiently to permit the nut to be freely screwed on, but any tendency of the nut to rotate in an opposite direction and unscrew will be resisted and prevented by the wedging of the wedge portion 6 against the threads of the bolt (Figs. 2 and 6). To unscrew the nut 2 from the bolt 1, pressure is applied to the upper end of the spring 7 to slide the locking wedge pin 5 slightly out of contact with the threads of the bolt 1 (Figs. 3 and 7), when the nut may be freely unscrewed, as indicated by the arrow 10 (Fig. 3). The locking wedge pin 5 is beveled at its ends and the contact of the spring 7 with these beveled ends prevents rotation of the wedge pin, which otherwise might occur when the nut is off the bolt and thereby the wedge portion 6 be displaced so as not to be in position for proper engagement with the threads of the bolt when the nut is applied thereto. The covering of the ends of the hole 3 and the exposed ends of the wedge pin 5 by the end portions of the flat spring 7 gives a finished appearance and prevents the entrance of dust and dirt to the hole 3. The spring 7 also effectively guards against loss of the locking wedge pin when the nut is not on the bolt, and nuts embodying this invention may be freely tossed about without injury and without loss of any of the parts. The locking devices are shown as located near to the back face or inner face of the nut so that locking engagement with the screw threads of the bolt will take place without the necessity of screwing the nut far on the bolt, thereby rendering the locking devices effective in case the bolt may be a trifle short and extend only partly through the nut. This sliding wedge construction is very effective in its locking function and is very inexpensive of manufacture, more so than those constructions of the prior art in which locking rollers or in which rocking locking bars are employed. This wedge construction also possesses the self-tightening quality, whereby the jars and vibrations of use will keep the nut tight and will tighten it if loose.

The general idea of a sliding locking wedge is capable of embodiment in a great many specific forms or modifications and several such modifications are illustrated in the drawings.

In the modified construction illustrated in Fig. 9, the only substantial difference from that above described is that the locking devices are shown as applied to a square nut 11 instead of to a hexagonal nut, a locking wedge pin 12 being engaged by a leaf spring 13 bent substantially at right angles around the square corners of the nut 11 and located in a groove 14, occupying portions of two sides of the nut, the spring 13 holding the wedge pin 12 in place and being held in place by an upsetting of the metal of the nut at 15. The construction and operation in other respects than as noted are substantially the same as in the construction first described.

The modified construction shown in Figs. 10 and 11 differs from that first above described, chiefly in that the locking wedge pin 16 is formed at its top end, as shown in the drawings, with a flattened extension 17 and the spring 18 is cut away at its upper end to form a prong 19, which engages at the side of the flattened extension 17 and thereby positively prevents rotation of the wedge pin 16, the extension 17 also serving to receive pressure directly to push the wedge pin 16 to non-locking position, the upper end of the spring 18 lying at all times against the bottom of the pin-receiving groove 20, as shown in Fig. 10.

The modified construction illustrated in Fig. 12 to 18, inclusive, differs chiefly from that first described in that a locking wedge pin 21 is employed which is of circular cross-section throughout its length and which tapers in wedge form throughout from end to end. A straight flat spring 22 is carried by a squared nut 23, being countersunk in a spring-receiving groove 24 and fixed therein by the upsetting at 25 of the material of the nut, the spring 22 pressing adjacent to its outer end against the larger end of the tapered wedge pin 21. The wedge pin 21 is of the proper diameter to have locking engagement between two of the threads of the bolt 1, as indicated at Fig. 17. When such locking pin is moved to non-locking position as shown in Fig. 14, the taper of the pin frees the pin from locking engagement with the threads of the bolt, as indicated at Fig. 18. The transverse pin-receiving hole 26 extends entirely through the nut, but its diameter is small enough to prevent the tapered locking pin dropping out at the end of the hole opposite to the spring 22, the hole 26 having an enlarged portion at 27 to permit the wedge pin 21 to move to its locking position. At the end of the pin-receiving hole 26 opposite to the spring 22 a cup-shaped recess 28 is provided, into which the smaller end of the wedge pin 21 projects when the wedge pin is at locking position (Fig. 13). Pressure applied by the finger or otherwise to the smaller end of the wedge pin 21 will slide the wedge pin 21 to non-locking position as shown in Fig. 14. This form of the invention is more readily applicable to squared ends, as shown in the drawings. The recess 28 permits the locking pin 21 to be at all times within the planes of the outer walls of the nut and therefore prevents any accidental displacement or injury to the locking pin.

The modification shown in Fig. 19 differs from that last described merely in the fact that the finger-receiving recess, such as 28, is omitted from the nut 29 and a locking wedge pin 30 is employed which is of sufficient length to extend at its smaller end beyond the outer wall of the nut as shown in this figure. Pressure applied to the projecting end of the wedge pin 30 will push it to non-locking position and such pressure may be applied by the jaws of the wrench used to unscrew the nut.

The modification shown at Fig. 20 differs from that last described in that a locking wedge pin 31 is shown which is shorter and terminates below the plane of the outer surface of the nut 32, the metal of the nut 32 being upset at 33 to partially close the pin-receiving hole 34 and thereby prevent the dropping out of the wedge pin 31, and therefore in this construction the pin-receiving hole 34 may be of uniform diameter throughout. The wedge pin 31 may be pushed to non-locking position by inserting a suitable implement through the reduced portion of hole 34.

The modified construction illustrated in Figs. 21 to 27, inclusive, differs from that described in reference to Figs. 12 to 18, inclusive, in the particular that a locking wedge 35 of rectangular cross-section, instead of circular cross-section, is employed, and is contained in a correspondingly shaped transverse wedge-receiving hole 36 in a square nut 37, the rectangular wedge 35 being grooved along one side to provide a plurality of ridges 38 adapted to have a locking engagement with the screw threads of the bolt 1. The construction in other respects is substantially the same as described in reference to Figs. 12 to 18, inclusive. This last described construction, because of the extending bearing surfaces, produces an especially firm and secure locking effect.

Figure 31:
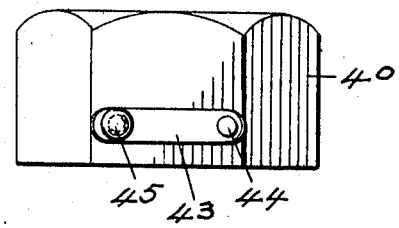
Figure 32:
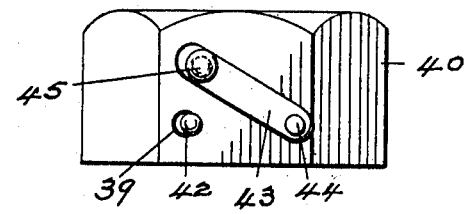
Figure 33:
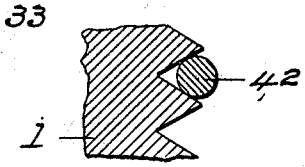
Figure 34:
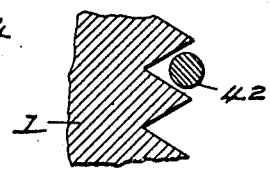

In the modification illustrated in Figs. 28 to 34, inclusive, a cylindrical wedge-receiving hole 39 of substantially uniform diameter throughout is provided in a hexagonal nut 40, but does not extend entirely through the nut, a smaller bore 41 being provided for the insertion of a suitable implement to push to non-locking position a tapered locking wedge pin 42, which is of substantially the same shape as the locking wedge pin 21, Figs. 12 to 18, inclusive. A substantially flat spring 43 is shown as pivotally secured at one end by a headed pin 44 to a side face of the nut 40 and at 45 is provided with a rounded indentation adapted to receive the rounded projecting larger end of the wedge pin 42, which the spring 43 presses into locking engagement with the screw threads of the bolt 1. In this construction the spring 43 may be swung aside, as shown in Figs. 30 and 31, to permit the removal and renewal of the wedge pin 42. Ordinarily the spring 43 is held in engagement with the outer end of the wedge pin 42 by the engagement of such outer end in the cup-shaped indentation 45.

The modified construction illustrated in Figs. 35 to 41, inclusive, differs from that last described in the fact that a locking wedge 46 of triangular, instead of circular, cross-section is provided and in the further fact that a wedge-receiving hole 47 of corresponding triangular cross-section is provided and, for convenience of manufacture, extends entirely through a similar nut 48, the metal of the nut being upset at 49 to prevent loss of the locking wedge when the nut is not on the bolt 1. Two of the sides of the triangular locking wedge are adapted to have locking engagement between two of the screw threads of the bolt 1 (Figs. 35 and 40) and are knurled, as indicated, to form a better locking engagement with the threads of the bolt, while the remaining side of the locking wedge is smooth, as indicated in Fig. 39, for sliding easily in the recess 47. The corners of the triangular wedge are shown as slightly rounded.

All of the several kinds of locking wedges illustrated are of a self-tightening nature, that is, when subjected to vibrations they tend to keep the nut tight and will tighten it if left loose.

It is obvious that various modifications may be made in the constructions shown and above particularly described within the principle and scope of my invention.

I claim:

1. The combination, with a screw-threaded bolt, of a screw-threaded nut having therein a pin-receiving hole extending transversely to the bolt-receiving aperture and communicating therewith, a wedge pin freely slidable in the transverse hole and adapted to have locking engagement between the screw threads of the bolt, one end of the wedge pin extending to the outside of the nut, and a leaf spring countersunk in one of the sides of the nut and adapted to press the wedge pin toward locking position.

2. The combination, with a screw-threaded bolt, of a screw-threaded nut having therein a pin-receiving hole extending through the nut transversely to the bolt-receiving aperture and communicating therewith, a wedge pin freely slidable in the transverse hole and adapted to have locking engagement with the screw threads of the bolt, both ends of the wedge pin extending to the outside of the nut, and a bent leaf spring countersunk in the sides of the nut and having a median portion secured to the nut and having terminal portions, one of which presses on one end of the wedge pin and tends to slide the wedge pin toward locking position and the other of which is adapted to be pressed against the other end of the wedge pin to slide it to unlocked position, such terminal portions also serving as protective coverings for the ends of the pin-receiving hole.

3. The combination, with a screw-threaded bolt, of a screw-threaded nut having therein a pin-receiving hole extending transversely to the bolt-receiving aperture and communicating therewith, a wedge pin freely slidable in the transverse hole and shaped to fit the screw-threads of the bolt and adapted to have locking engagement therewith, and a spring carried by the nut tending to press the wedge pin to locking position and having means to prevent rotation of the wedge pin.

4. The combination, with a screw-threaded bolt, of a screw-threaded nut having therein a round hole extending through the nut transversely to the bolt-receiving aperture and communicating therewith, a substantially cylindrical wedge pin freely slidable in the transverse hole and shaped at its median portion to form a wedge fitting between the screw threads of the bolt and adapted to have locking engagement therewith, the wedge pin terminating in beveled ends at the outside of the nut, and a bent leaf spring carried by the nut and having a portion pressing on one end of the wedge pin and tending to slide the wedge pin toward locking position and having another portion adapted to be pressed against the other end of the wedge pin to slide it to unlocked position, the contact of the spring with the beveled ends of the wedge pin preventing rotational displacement of the wedge pin.

5. The combination, with a screw-threaded bolt, of a screw-threaded nut having therein a pin-receiving hole extending transversely to the bolt-receiving aperture and communicating therewith, a wedge pin freely slidable in the transverse hole and shaped to fit between the screw threads of the bolt so as to have locking engagement therewith, and a flat spring secured to the nut and having a free portion in the path of the wedge pin and arranged to press the wedge pin toward locking position, means other than the securing means being provided for maintaining the spring in the path of the wedge pin when the wedge pin is in locking position.

In testimony whereof I have affixed my signature in presence of two witnesses.

MORRIS JACOBS.

Witnesses:
WM. ASHLEY KELLY,
BERNARD COWEN.